United States Patent
Otosaka

(10) Patent No.: US 12,325,657 B2
(45) Date of Patent: Jun. 10, 2025

(54) WIRE-DRAWING OPTICAL FIBER BASE MATERIAL MANUFACTURING METHOD AND MANUFACTURING APPARATUS

(71) Applicant: Shin-Etsu Chemical Co., Ltd., Tokyo (JP)

(72) Inventor: Tetsuya Otosaka, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 385 days.

(21) Appl. No.: 17/853,905

(22) Filed: Jun. 29, 2022

(65) Prior Publication Data

US 2022/0332627 A1    Oct. 20, 2022

Related U.S. Application Data

(62) Division of application No. 15/909,912, filed on Mar. 1, 2018, now Pat. No. 11,384,006.

(30) Foreign Application Priority Data

Mar. 1, 2017 (JP) .................................. 2017-038819

(51) Int. Cl.
  *C03B 37/029* (2006.01)
  *C03B 37/027* (2006.01)
  (Continued)

(52) U.S. Cl.
  CPC ...... *C03B 37/032* (2013.01); *C03B 37/02772* (2013.01); *C03B 37/029* (2013.01);
  (Continued)

(58) Field of Classification Search
  CPC ............ C03B 2205/09; C03B 2205/08; C03B 37/029; C03B 2205/90; C03B 2205/91
  See application file for complete search history.

(56) References Cited

U.S. PATENT DOCUMENTS 4,174,842 A * 11/1979 Partus ................... C03B 37/029
                                          277/906
4,400,190 A *  8/1983 Briere ................... C03B 37/029
                                          65/498
(Continued)

FOREIGN PATENT DOCUMENTS

CN          1354731 A    6/2002
CN        104071977 A   10/2014
(Continued)

OTHER PUBLICATIONS

Office Action issued for counterpart Japanese Application No. 2017-038819, issued by the Japan Patent Office on Jan. 7, 2020 (drafted on Dec. 26, 2019).

(Continued)

*Primary Examiner* — Erin Snelting
*Assistant Examiner* — Steven S Lee

(57) ABSTRACT

A wire-drawing optical fiber base material manufacturing method of heating an optical fiber base material by a heater and forming a drawing shape portion at an end portion. The manufacturing method includes: forming, by a flow-regulating member disposed adjacent to the heater, a gas flow such that formation, along a surface of the optical fiber base material, of a flow of a gas containing a Si compound generated from the optical fiber base material heated by the heater is inhibited; and forming, while maintaining the gas flow, the drawing shape portion by pulling part of the optical fiber base material softened by being heated by the heater.

11 Claims, 7 Drawing Sheets

(51) Int. Cl.
*C03B 37/03* (2006.01)
*C03C 13/04* (2006.01)

(52) U.S. Cl.
CPC .......... *C03C 13/04* (2013.01); *C03B 2205/63* (2013.01); *C03B 2205/90* (2013.01); *Y02P 40/57* (2015.11)

(56) References Cited

U.S. PATENT DOCUMENTS

| | | | |
|---|---|---|---|
| 4,673,427 A * | 6/1987 | Van Der Giessen | ........................ C03B 37/029 65/435 |
| 4,988,374 A * | 1/1991 | Harding | ................ C03B 37/029 65/435 |
| 6,658,897 B2 | 12/2003 | Berndt | |
| 2002/0088253 A1 | 7/2002 | Roba | |
| 2002/0100297 A1* | 8/2002 | Berndt | .................. C03B 37/029 65/374.13 |
| 2007/0180862 A1 | 8/2007 | Takahashi | |
| 2009/0145169 A1* | 6/2009 | Bae | ........................ C03B 37/029 65/424 |
| 2017/0275199 A1 | 9/2017 | Otosaka | |
| 2018/0014358 A1 | 1/2018 | Otosaka | |

FOREIGN PATENT DOCUMENTS

| | | | | |
|---|---|---|---|---|
| EP | 0105563 A1 | | 4/1984 | |
| EP | 0386756 A1 | * | 9/1990 | ........... C03B 37/029 |
| EP | 0795519 A1 | | 9/1997 | |
| EP | 0850890 A1 | | 7/1998 | |
| JP | S58104032 A | | 6/1983 | |
| JP | S59217641 A | * | 12/1984 | ........... C03B 37/025 |
| JP | S62138340 A | | 6/1987 | |
| JP | S62207735 A | * | 9/1987 | |
| JP | S63123833 A | | 5/1988 | |
| JP | H5-24877 A | | 2/1993 | |
| JP | 2004224587 A | | 8/2004 | |
| JP | 2006131427 A | | 5/2006 | |
| JP | 2012082089 A | * | 4/2012 | ........... C03B 37/029 |
| KR | 20040020648 A | | 3/2004 | |
| KR | 100702738 B1 | * | 4/2007 | ........... C03B 37/029 |

OTHER PUBLICATIONS

Notice of First Office Action for Patent Application No. 201810171263.7, issued by the National Intellectual Property Administration of the People's Republic of China on Aug. 31, 2021.

Office Action for Indian Patent Application No. 201814007558, issued by the Intellectual Property India on Dec. 31, 2021.

Prosecution History of the parent U.S. Appl. No. 15/909,912, filed Mar. 1, 2018.

Losilevskiy Igor et al.,"Properties of high-temperature phase diagram and critical point parameters in silica", High Temperatures-High Pressures. 43; Paper presented at the 10th Int. Workshop on Subsecond Thermophysics, Jun. 26-28, 2013, Karlsruhe, Germany. Submitted to: Hi.

* cited by examiner

WIRE-DRAWING OPTICAL FIBER BASE MATERIAL MANUFACTURING METHOD AND MANUFACTURING APPARATUS

CROSS-REFERENCE TO RELATED APPLICATIONS

This application is a divisional of U.S. patent application Ser. No. 15/909,912, filed on Mar. 1, 2018, the entire contents of which is expressly incorporated herein by reference. The application also claims priority from the following Japanese patent application, which is explicitly incorporated herein by reference:

No. 2017-038819, filed on Mar. 1, 2017.

BACKGROUND

1. Technical Field

The present invention relates to a wire-drawing optical fiber base material manufacturing method and manufacturing apparatus.

2. Related Art

There is a manufacturing method for manufacturing a wire-drawing optical fiber base material including a portion to be a core also at a drawing shape portion at an end portion thereof, by processing an optical fiber base material including an ineffective portion not to be an optical fiber even if it is wire-drawn (Patent Document 1).

[Patent Document 1] Japanese Patent Application Publication No. H5-24877

If a process of heating the optical fiber base material and forming the drawing shape portion at the end portion is performed, Si compound fine particles generated from the optical fiber base material re-adhere to the surface of the optical fiber base material, and roughen the surface of the optical fiber base material in some cases.

SUMMARY

A first aspect of the present invention provides a wire-drawing optical fiber base material manufacturing method of heating an optical fiber base material by a heater and forming a drawing shape portion at an end portion. The manufacturing method includes: forming, by a flow-regulating member disposed adjacent to the heater, a gas flow such that formation, along a surface of the optical fiber base material, of a flow of a gas containing a Si compound generated from the optical fiber base material heated by the heater is inhibited; and forming, while maintaining the gas flow, the drawing shape portion by pulling part of the optical fiber base material softened by being heated by the heater.

A second aspect of the present invention provides a manufacturing apparatus that manufactures a wire-drawing optical fiber base material. The manufacturing apparatus includes: a heater that heats an optical fiber base material; a flow-regulating member that: is arranged adjacent to the heater; and forms a gas flow such that formation, along a surface of the optical fiber base material, of a flow of a gas containing a Si compound generated from the optical fiber base material heated by the heater is inhibited; and a pulling unit that pulls part of the optical fiber base material softened by being heated by the heater and forms a drawing shape portion at an end portion.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiment(s) do(es) not limit the invention according to the claims, and all the combinations of the features described in the embodiment(s) are not necessarily essential to means provided by aspects of the invention.

Figure 1:
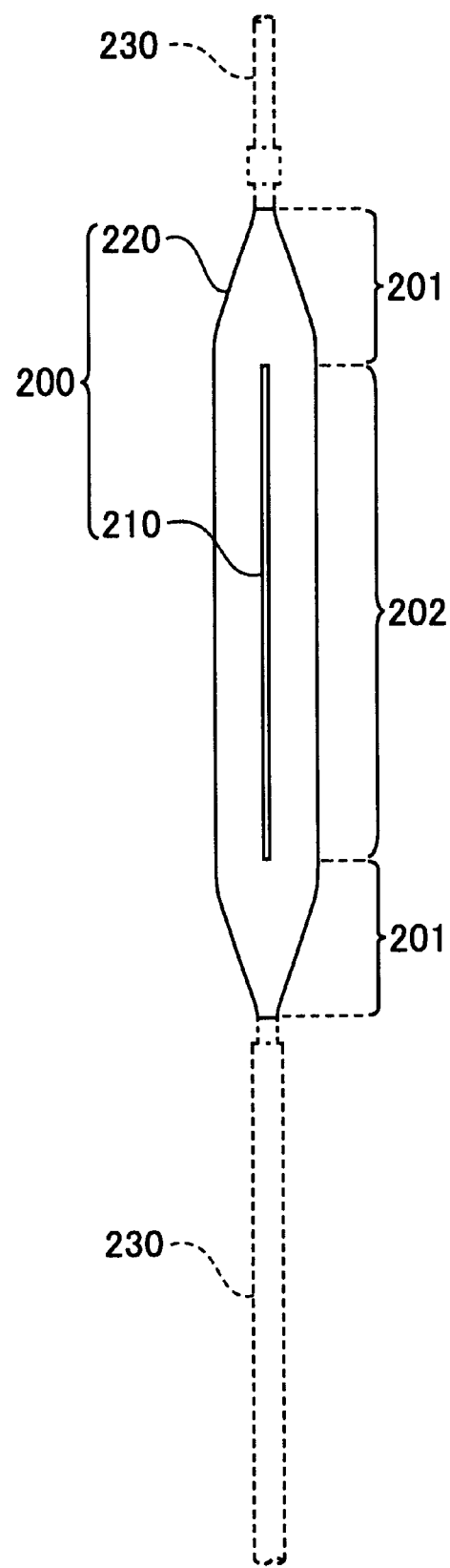
FIG. 1 is a schematic cross-sectional view of an optical fiber base material 200.

FIG. 1 is a schematic cross-sectional view of an optical fiber base material 200. The illustrated optical fiber base material 200 is at a step before it becomes a wire-drawing optical fiber base material by drawing mentioned below.

The optical fiber base material 200 has a columnar portion at least at its center in the longitudinal direction, and has a core material 210 disposed at the center in the radial direction and a clad material 220 surrounding the core material 210 at its circumference. The core material 210 is formed of a material with a high degree of transparency and a high refractive index. The clad material 220 is formed of a material having a relatively low refractive index as compared with that of the core material 210.

If the optical fiber base material 200 is to be processed, it is coupled with dummy portions 230 at its both end portions in the longitudinal direction as indicated with dotted lines in the figure. The dummy portions 230 are, for example, formed of a glass material and are coupled to the optical fiber base material 200 by welding. Thereby, the optical fiber base material 200 can be supported and fixed by one of the dummy portions 230 being gripped and without any contact with the optical fiber base material 200. Also, by gripping and pulling the other dummy portion 230, tension can be applied to the optical fiber base material 200 without any contact with the optical fiber base material 200 itself.

The optical fiber base material 200 is manufactured by any of various methods such as MCVD methods (Metal organic Chemical Vapor Deposition methods), PCVD methods (Plasma-activated Chemical Vapor Deposition methods), VAD methods (Vapor-phase Axial Deposition methods), OVD methods (Outside Vapor Deposition methods) or rod-in-tube methods. No matter which manufacturing method is used for the manufacturing, ineffective portions 201 are formed at the both ends of the optical fiber base material 200.

At the ineffective portions 201, the core material 210 is not present inside the clad material 220. Because of this, the ineffective portions 201, even if they are wire-drawn, do not form an optical fiber that confines and transmits light therein. In view of this, if an optical fiber is to be manufactured, the ineffective portions 201 are eliminated from the optical fiber base material 200 prior to the wire-drawing to attain a state where the core material 210 is present up to the end portions.

Also, if an optical fiber is to be wire-drawn, the optical fiber base material 200 preferably forms a drawing shape with its outer diameter consecutively decreasing and becoming small at its end portion. In view of this, prior to wire-drawing, drawing to form the drawing shape at an end portion of the optical fiber base material 200 is implemented as well, along with elimination of the ineffective portions 201.

Figure 2:
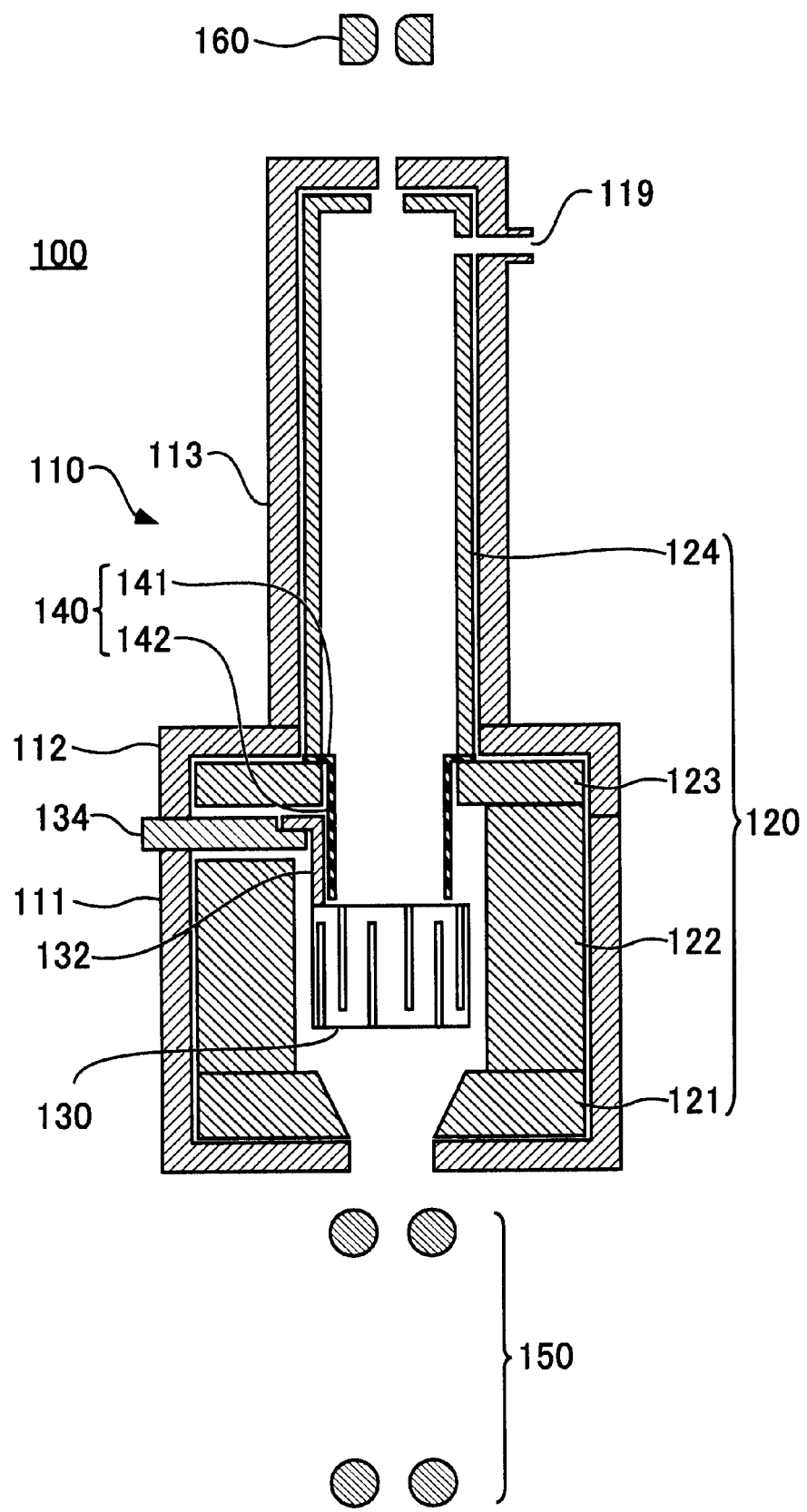
FIG. 2 is a schematic cross-sectional view of a manufacturing apparatus 100.

FIG. 2 is a schematic cross-sectional view showing a structure of a manufacturing apparatus 100. This manufacturing apparatus 100 is used for a process of eliminating the ineffective portions 201 from the optical fiber base material 200 and forming a drawing shape. The manufacturing apparatus 100 includes: a heat insulating material 120, a heater 130 and a flow-regulating member 140 that are disposed inside a furnace body formed by a vertically long furnace body 110; and pulling rollers 150 disposed outside and below the furnace body.

The furnace body 110 as a whole forms a vertically long tube. The furnace body 110 is formed by sequentially stacking a lower portion furnace wall 111, a lid portion furnace wall 112 and an upper portion furnace wall 113.

The lower portion furnace wall 111 has a cylindrical shape with its top surface being open, and has, at the center of its bottom portion, a hole through which the lower end of the optical fiber base material 200 is pulled out. The bottom portion inner surface and side wall inner surface of the lower portion furnace wall 111 are covered with a bottom portion heat insulating material 121 and a lower portion heat insulating material 122 that are sequentially stacked.

The upper end of the lower portion furnace wall 111 is sealed with a lid portion furnace wall 112 laid over the lower portion furnace wall 111. The lid portion furnace wall 112 has, at its center, a hole through which the optical fiber base material 200 can be inserted. Also, the inner surface of the lid portion furnace wall 112 is also covered with a lid portion heat insulating material 123 stacked on the lower portion heat insulating material 122. The lid portion furnace wall 112 and the lid portion heat insulating material 123 can be removed from the furnace body 110 if the heater 130 inside the furnace body 110 is to be replaced.

Furthermore, the upper portion furnace wall 113 having a diameter smaller than that of the lower portion furnace wall 111 is stacked on the top surface of the lid portion furnace wall 112. The upper portion furnace wall 113 has, at its upper end, a hole through which the upper end of a dummy portion 230 coupled to the optical fiber base material 200 is inserted. The upper portion furnace wall 113 and an upper portion heat insulating material 124 can be removed from the furnace body 110 if the optical fiber base material 200 is to be inserted into the furnace body 110.

The side surface near the upper end of the upper portion furnace wall 113 is provided with a supply port 119 through which an inert gas is supplied from the outside of the furnace body 110 to the inside of it. By filling the inside of the furnace body 110 through the supply port 119 with an inert gas such as an argon gas or a nitrogen gas, deterioration, due to oxidation, of the heat insulating material 120 including the bottom portion heat insulating material 121, lower portion heat insulating material 122, lid portion heat insulating material 123 and upper portion heat insulating material 124 formed of carbon or the like can be prevented. Also, deterioration due to oxidation of the heater 130 made of carbon also is suppressed.

Inside the lower portion furnace wall 111 of the furnace body 110, the heater 130 is disposed inside the bottom portion heat insulating material 121, lower portion heat insulating material 122 and lid portion heat insulating material 123. In recent years, the diameter of the optical fiber base material 200 has been increasing, and the outer diameter has reached about 200 mm. If such an optical fiber base material with a large diameter is to be drawn, it is difficult to uniformly heat the entire body with a gas burner. In view of this, the heater 130 of the manufacturing apparatus 100 to be used is an electric heater to receive electric power supply from the outside.

Because of this, the heater 130 has an electrode member 132 to be a connection terminal to supply electric power from the outside. Two electrode members 132, if the power source of the heater 130 is a single phase power source, and three electrode members 132, if it is a three-phase power source, are disposed at constant intervals in the circumferential direction of the heater 130. The upper end of the electrode member 132 extends horizontally outward in the radial direction of the furnace body 110 and is coupled to one end of an electric power supply unit 134. Because of this, it can be said that the flow-regulating member 140 is arranged in a section where the electrode member 132 is present.

The electric power supply unit 134 is fixed to the furnace body 110, and additionally extends outward in the radial direction of the furnace body 110 to penetrate the lower portion furnace wall 111 and lower portion heat insulating material 122 horizontally. Thereby, the electric power supply unit 134 is, at one of its ends, exposed to the outside of the furnace body 110. The electric power supply unit 134 has a structure in which a refrigerant such as water circulates therein, and prevents temperature on the outer side of the furnace body 110 from becoming extremely high.

The electrode member 132 is positioned by hanging the heater 130 inside the furnace body 110 with the upper end of the electrode member 132 being placed on an inner end portion of the electric power supply unit 134. Also, electric power can be supplied from the outside of the furnace body 110 to the heater 130 inside the furnace body 110 through the electric power supply unit 134 and electrode member 132.

Inside the furnace body 110 and above the heater 130, the flow-regulating member 140 is disposed adjacent to the heater 130. The flow-regulating member 140 has a flange portion 141 and a tubular portion 142. The flow-regulating member 140 may be formed of carbon, for example, similar to the heat insulating material 120 and the like.

The tubular portion 142 of the flow-regulating member 140 is cylindrical with approximately constant inner and outer diameters and is disposed inside the lower portion heat insulating material 122 and the lid portion heat insulating material 123 of the furnace body 110. Also, the tubular portion 142 is arranged inside the electrode member 132 of the heater 130 as well. The tubular portion 142 has an inner diameter that allows the optical fiber base material 200 to penetrate therethrough without any contact with the optical fiber base material 200. Thereby, the optical fiber base material 200 is surrounded by the tubular portion 142 in the furnace body 110.

The flange portion 141 of the flow-regulating member 140 spreads from the upper end of the tubular portion 142 outward in the radial direction. The flange portion 141 is wider than the inner diameter of the hole of the lid portion heat insulating material 123. Accordingly, inside the manufacturing apparatus 100, the outer edge of the flange portion 141 is sandwiched by the top surface of the lid portion heat insulating material 123 and the lower end of the upper portion heat insulating material 124. Thereby, the flow-regulating member 140 is positioned inside the furnace body 110.

The flow-regulating member 140 can be replaced by lifting it from the lid portion heat insulating material 123 if the upper portion furnace wall 113 of the furnace body 110 and the upper portion heat insulating material 124 are removed. Accordingly, the flow-regulating member 140 can be replaced with another one if it deteriorated. Also, depending on operation conditions of the manufacturing apparatus 100, the outer diameter of the optical fiber base material 200 inserted to the manufacturing apparatus 100, or the like, a suitable one among a plurality of flow-regulating members 140 having mutually different inner diameters can be selectively used.

Furthermore, the manufacturing apparatus 100 includes a chuck 160 disposed outside and above the furnace body 110. The chuck 160 is used to grip a dummy portion 230 coupled to the upper end of the optical fiber base material 200 contained inside the furnace body 110 to hang the optical fiber base material 200.

Also, the manufacturing apparatus 100 includes the pulling rollers 150 disposed outside and below the furnace body 110. The pulling rollers 150 rotate with a dummy portion 230 coupled to the optical fiber base material 200 heated inside the furnace body 110 being sandwiched therebetween, thereby applying tension to the optical fiber base material 200 contained in the furnace body 110 and pulling the optical fiber base material 200 from its lower end. Thereby, it is possible to apply tension to the optical fiber base material 200, eliminate a lower end side end portion of the optical fiber base material 200, and also form a drawing shape.

Figure 3:
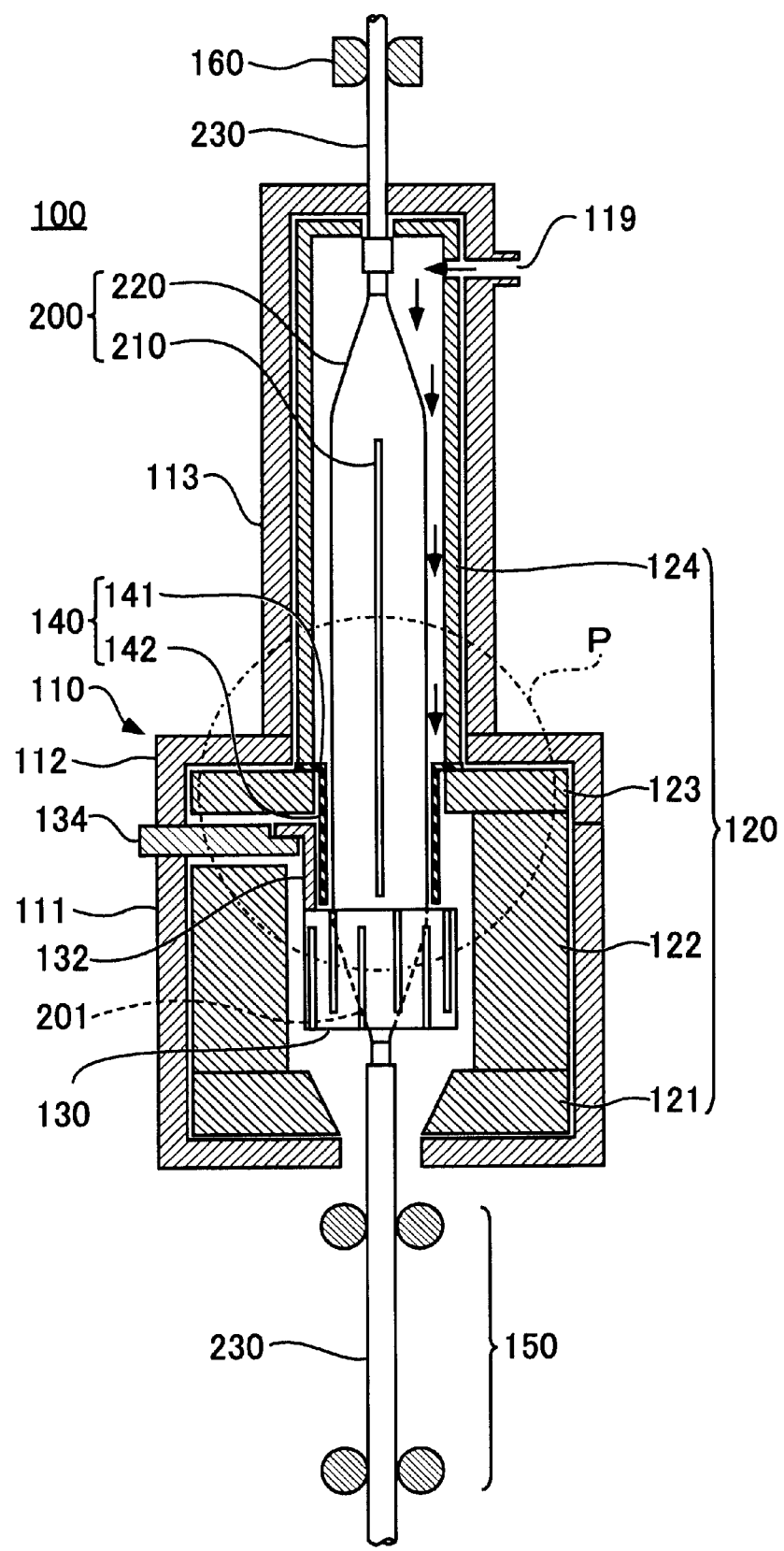
FIG. 3 is a schematic cross-sectional view of the manufacturing apparatus 100.

FIG. 3 is a schematic cross-sectional view for explaining drawing using the manufacturing apparatus 100. FIG. 3 shows a state before drawing is started, and the optical fiber base material 200 including the ineffective portions 201 is loaded inside the manufacturing apparatus 100.

The lower end (in the direction as seen in the figure) of a dummy portion 230 is coupled to the upper end (in the direction as seen in the figure) of the optical fiber base material 200 by welding. An upper portion of the dummy portion 230 is gripped by the chuck 160 outside the furnace body 110. Thereby, the optical fiber base material 200 is contained inside the furnace body 110 without any contact with surrounding furnace walls.

Portions near the lower end of the optical fiber base material 200 contained in the furnace body 110 are positioned inside the heater 130. Thereby, if the heater 130 started heating, the ineffective portion 201 positioned near the lower end of the optical fiber base material 200 is heated.

Also, in the manufacturing apparatus 100, an inert gas is supplied into the furnace body 110 from the supply port 119, prior to heating of the optical fiber base material 200 by the heater 130. The supplied inert gas initially fills the inside of the upper portion furnace wall 113, and then is pushed out toward the lower portion furnace wall 111. Thereby, the inside of the furnace body 110 is filled with the inert gas, and the heat insulating material 120 and the heater 130 are blocked from the atmosphere containing oxygen. Accordingly, even if temperature of the heat insulating material 120 and the heater 130 increases, deterioration of these members due to oxidation is suppressed.

Figure 4:
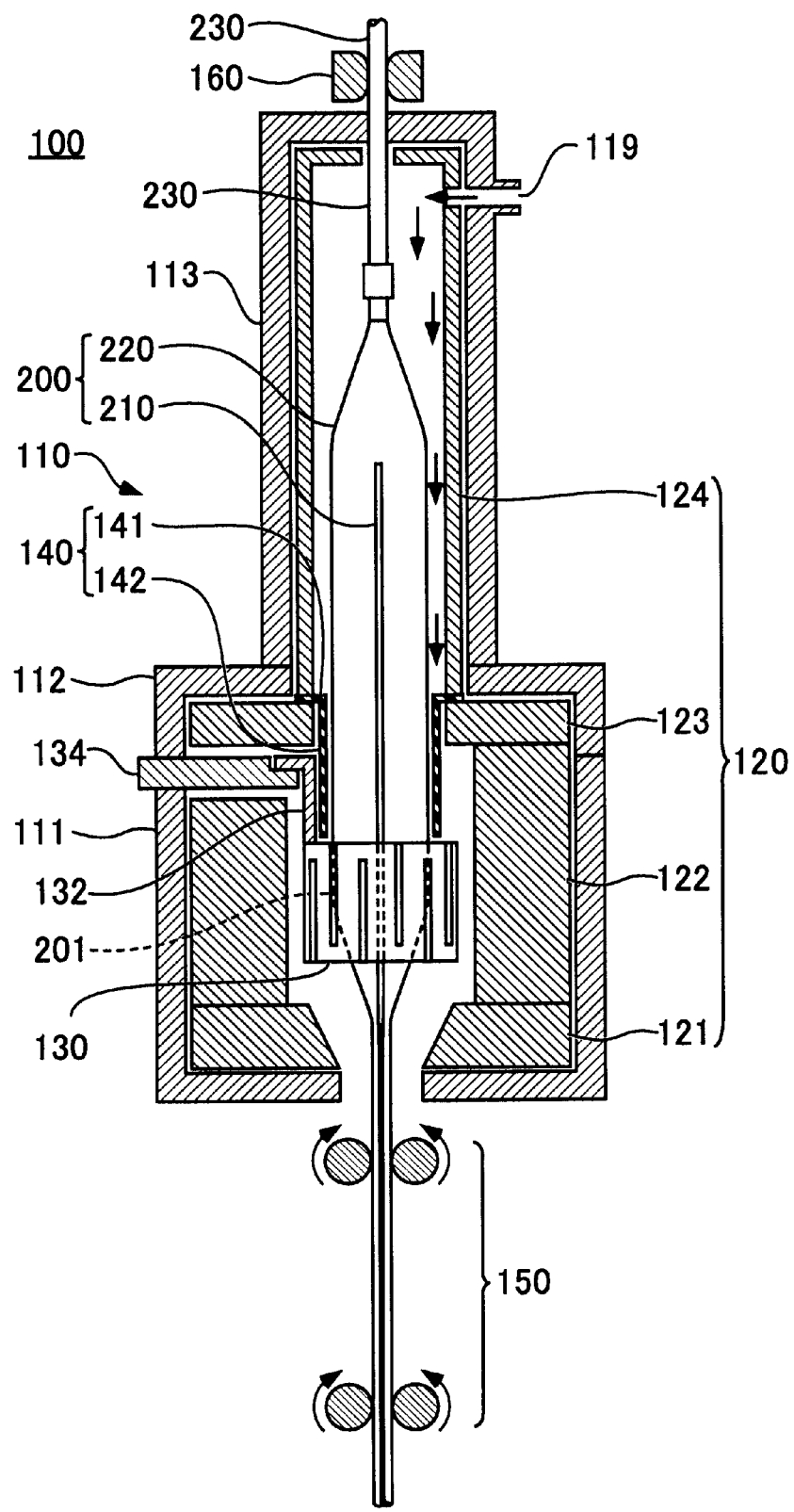
FIG. 4 is a schematic cross-sectional view of the manufacturing apparatus 100.

FIG. 4 is a schematic cross-sectional view of the manufacturing apparatus 100. FIG. 4 shows how it appears if an ineffective portion 201 is pulled from the optical fiber base material 200 in the manufacturing apparatus 100.

First, starting from a state where the inside of the furnace body 110 is filled with an inert gas, the inert gas is further supplied into the furnace body 110, and at the same time, electric power is supplied to the heater 130 to heat the optical fiber base material 200. The optical fiber base material 200 partially heated inside the heater 130 softens at a region thereof including an ineffective portion 201 surrounded by the heater 130.

By rotating, in this state, the pulling rollers 150 sandwiching a lower dummy portion 230 as indicated with arrows in the figure, the optical fiber base material 200 can be pulled from its lower end side. Also, the chuck 160 is lowered in synchronization with part of the optical fiber base material 200 being pulled by the pulling rollers 150 to gradually move a position of the optical fiber base material 200 at which it is heated by the heater 130. Thereby, the optical fiber base material 200 is pulled downward sequentially from the lower end side (in the direction as seen in the figure).

Then, part of the effective portion 202 having the core material 210 begins to be pulled by the pulling roller 150. In this manner, an ineffective portion 201 is eliminated from the lower end side of the optical fiber base material 200, and the lower end side of the optical fiber base material 200 becomes the effective portion 202 having the core material 210 down to its lower end. Also, at the lower end of the optical fiber base material 200, a drawing shape is formed in the effective portion 202.

Figure 5:
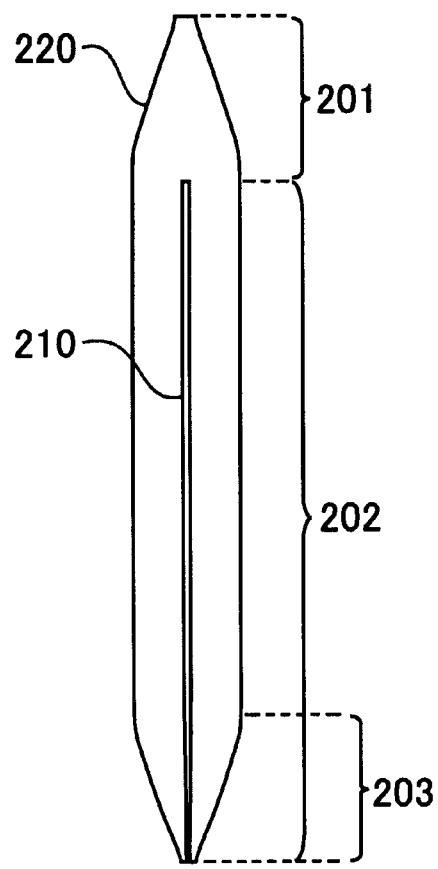
FIG. 5 is a schematic cross-sectional view of a wire-drawing optical fiber base material 300.

FIG. 5 is a schematic cross-sectional view showing a wire-drawing optical fiber base material 300 manufactured in the above-mentioned manner. In the wire-drawing optical fiber base material 300, at least on the lower side (in the direction as seen in the figure), the effective portion 202 has the core material 210 present therein down to the end portion.

Also, on the lower end side of the wire-drawing optical fiber base material 300, a portion having been sandwiched by the pulling rollers 150 is cut off, and a drawing shape is formed at the lower end (in the direction as seen in the figure) of the effective portion 202. In this manner, an end portion of the wire-drawing optical fiber base material 300 having the core material 210 and having a drawing shape as well becomes a lead-out portion 203 at which pulling of an optical fiber is started if the optical fiber is to be wire-drawn.

Figure 6:
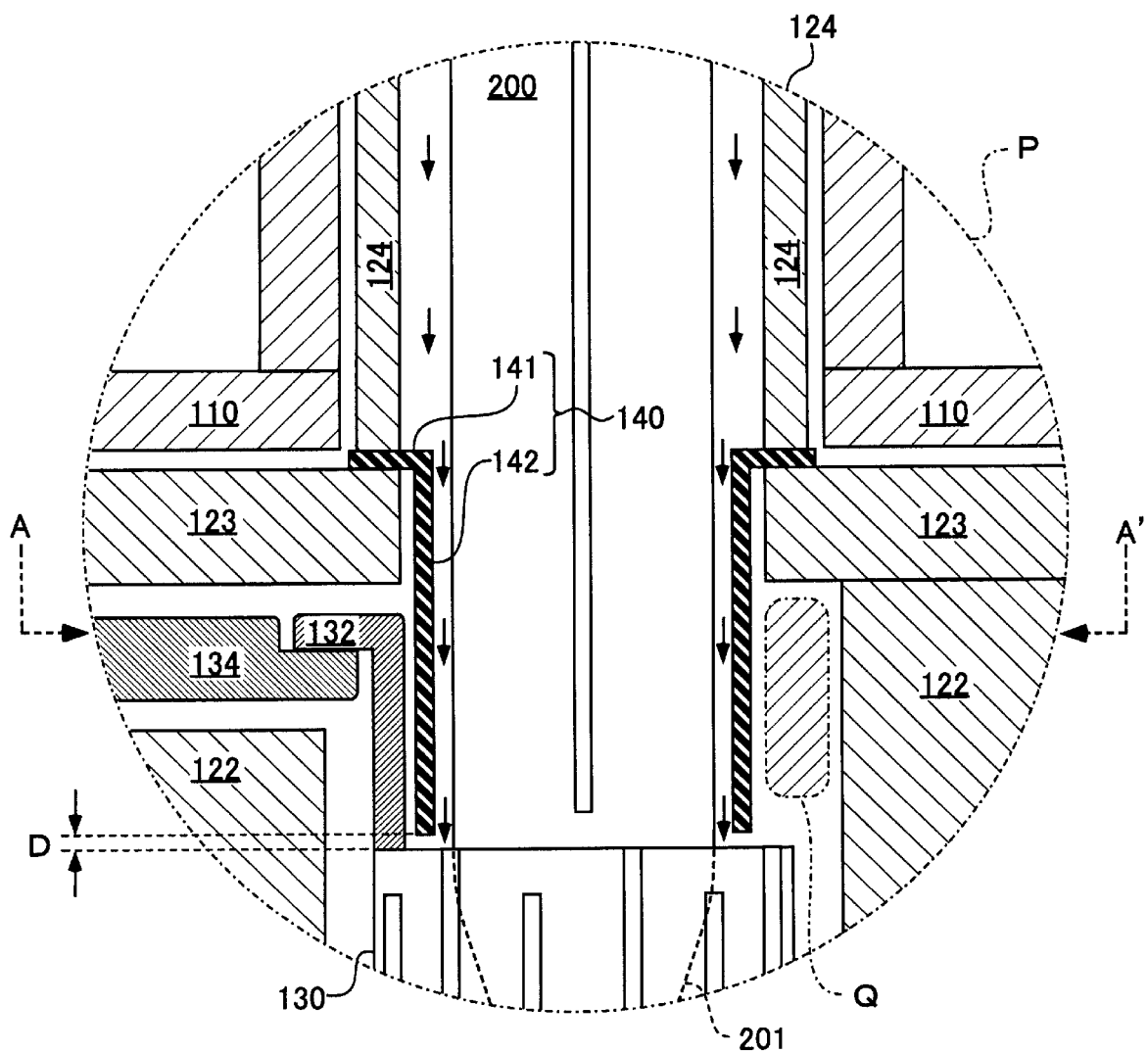
FIG. 6 is a schematic partially enlarged cross-sectional view of the manufacturing apparatus 100.

FIG. 6 is a partially enlarged cross-sectional view showing an enlarged view of a region surrounded by a circle P indicated with a dashed line in FIG. 3. As shown in FIG. 6, the tubular portion 142 of the flow-regulating member 140 has a constant inner diameter larger than the external form of the optical fiber base material 200, and is disposed adjacent to the heater 130 in the longitudinal direction of the optical fiber base material 200. Accordingly, an inert gas supplied to the upper side (in the direction as seen in the figure) of the flow-regulating member 140 forms a gas flow to flow between the optical fiber base material 200 and the tubular portion 142.

Also, the flange portion 141 provided to the upper end (in the direction as seen in the figure) of the flow-regulating member 140 spreads outward from the tubular portion 142 and is sandwiched by the lid portion heat insulating material 123 and the upper portion heat insulating material 124. Accordingly, the space between the outer side of the tubular portion 142 and the lower portion heat insulating material 122 and lid portion heat insulating material 123 are blockaded by the flange portion 141.

Accordingly, the flow-regulating member 140 blocks an inert gas flow flowing in the longitudinal direction of the optical fiber base material 200 at a position away from the surface of the optical fiber base material 200.

Because of this, in the manufacturing apparatus 100, the inert gas supplied from the supply port 119 flows along the surface of the optical fiber base material 200 as indicated with arrows in the figure. Also, because the interval between the optical fiber base material 200 and the tubular portion 142 of the flow-regulating member 140 is constant in the longitudinal direction of the optical fiber base material 200, the linear velocity of the inert gas becomes approximately constant between the optical fiber base material 200 and the flow-regulating member 140.

Figure 7:
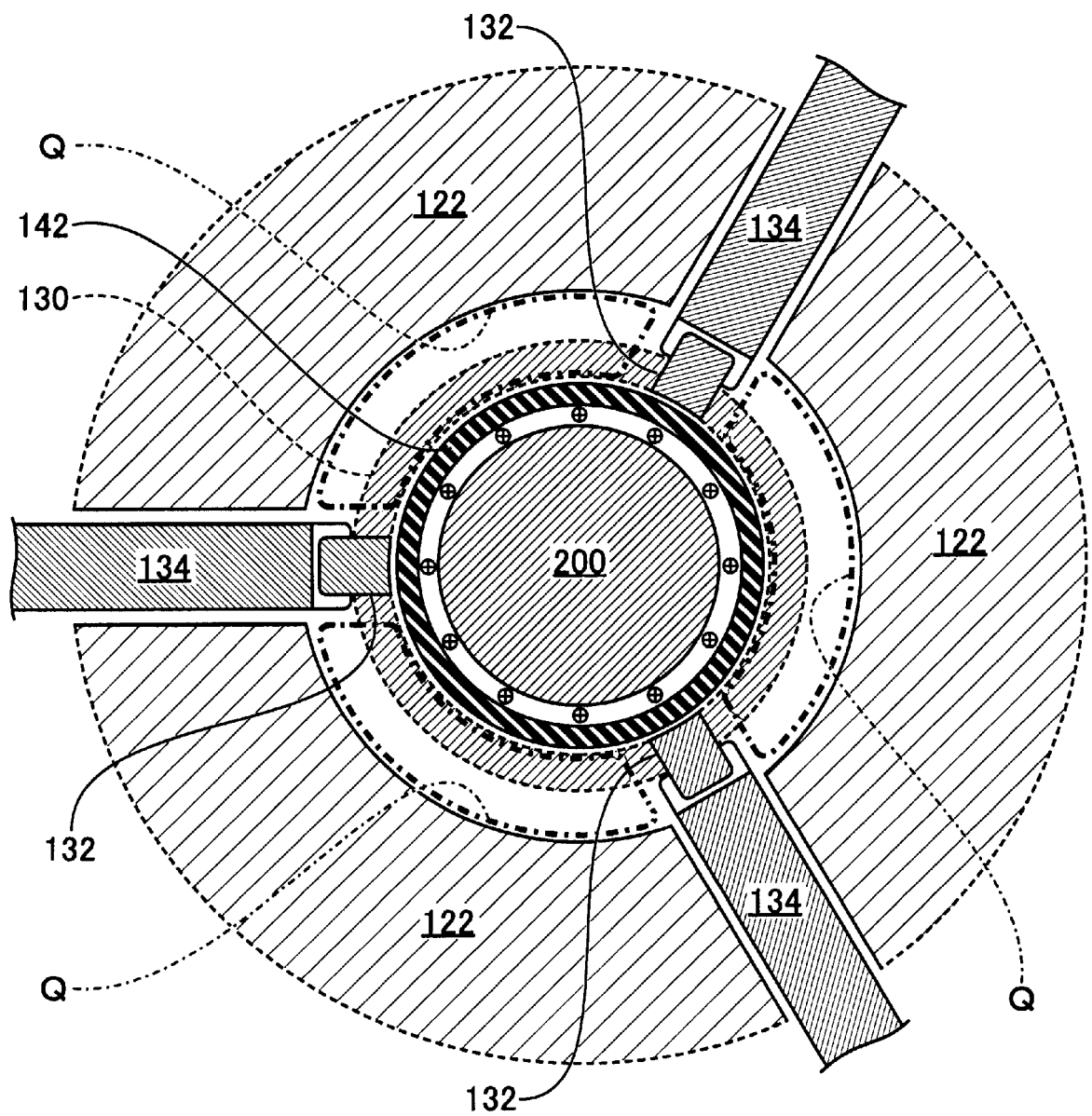
FIG. 7 is a schematic partially enlarged cross-sectional view of the manufacturing apparatus 100.

FIG. 7 is a partial horizontal cross-sectional view showing a cross section taken along A-A' shown in FIG. 6. In FIG. 7, the heater 130 which actually does not appear in the cross section taken along A-A' is indicated with a dashed line in order to indicate a positional relationship.

As illustrated, at portions near an upper portion of the heater 130, the size of the space surrounding the optical fiber base material 200 differs between at a position where the electrode member 132 and electric power supply unit 134 are present and at a position where they are not present. However, because the tubular portion 142 of the flow-regulating member 140 is positioned inside the electrode members 132, regardless of presence or absence of the electrode members 132 or the like, the thickness of the space where an inert gas flow is formed becomes constant in the circumferential direction of the optical fiber base material 200 when seen in a cross section where the flow-regulating member 140 is present.

In this manner, in the manufacturing apparatus 100, a flow path for an inert gas having constant width is formed in both the longitudinal direction and circumferential direction of the optical fiber base material 200, along the surface of the optical fiber base material 200. Thereby, by supplying an inert gas from the supply port 119 positioned at an upper portion of the furnace body 110, a uniform gas flow can be formed along the surface of the optical fiber base material 200 on the upstream side of the heater 130 in the flow of the inert gas.

Meanwhile, in a step of manufacturing the wire-drawing optical fiber base material 300 having the lead-out portion 203 in the manufacturing apparatus 100, Si compounds are volatilized from the optical fiber base material 200 heated by the heater 130. If the volatilized Si compounds reach a region which is on the surface of the optical fiber base material 200 and is away from the heater 130, that is, a relatively low temperature region, it adheres to the region as SiO fine particles, SiO2 fine particles or the like.

If Si compound fine particles adhere to the surface of the optical fiber base material 200, the surface roughness of the region increases, and it becomes easier for the surface to be contaminated. If the contaminated optical fiber base material 200 is wire-drawn, crystallization of a tarnished portion is accelerated by heating for the wire-drawing, and this significantly deteriorates the strength of an optical fiber, causes variation in its outer diameter, and so on, in some cases.

It is difficult to eliminate tarnish generated to the optical fiber base material 200 simply by wiping off with a waste cloth or the like, and for example it can be eliminated by washing using hydrofluoric acid. However, use of hydrofluoric acid increases an environmental burden, and also increases cost of manufacturing the optical fiber base material 200.

However, in the manufacturing apparatus 100, a gas flow to flow from the upstream side in the distribution direction of an inert gas toward the heater 130 is formed by the flow-regulating member 140 adjacent to the heater 130. This gas flow is maintained by continuously supplying the inert gas from the supply port 119. Accordingly, a flow of a gas containing volatilized Si compounds along the surface of the optical fiber base material 200 is inhibited. Also, because the flow path formed inside the flow-regulating member 140 has a uniform width, it is difficult for a turbulent flow to be generated to the inert gas, and the atmosphere containing volatilized Si compounds is prevented from being stirred up toward a low temperature side of the optical fiber base material 200.

If the flow-regulating member 140 is arranged between the heater 130 and the optical fiber base material 200, radiant heat is blocked by the flow-regulating member 140, and the efficiency of heating the optical fiber base material 200 by the heater 130 deteriorates. If output of the heater 130 is increased for the purpose of compensating deterioration of the efficiency, the lifetime of the heater 130 shortens. Accordingly, the flow-regulating member 140 is preferably not arranged between the heater 130 and the optical fiber base material 200.

Also, in the manufacturing apparatus 100, part of a gas containing Si compounds volatilized from the optical fiber base material 200 is retained in a region Q (please see FIG. 6 and FIG. 7) positioned outside the flow-regulating member, and at the same time gradually lowers to be discharged from the lower end of the furnace body 110 to the outside of the furnace. Because in a region extending from the region Q to the lower end of the furnace body 110, the surface of the optical fiber base material 200 is at high temperature, tarnish due to adhesion of Si compound fine particles is never generated in this region.

The linear velocity of an inert gas flow between the optical fiber base material 200 and the flow-regulating member 140 in the manufacturing apparatus 100 preferably is equal to or higher than 1.3 m per second and is lower than 10 m per second. If the linear velocity is lower than 1.3 m/s, exclusion of a gas containing Si compounds from the surface of the optical fiber base material 200 was not sufficient, and tarnish was generated, in some cases. On the other hand, if the linear velocity is about 10 m per second, tarnish can be prevented, and the linear velocity needs not be increased further. Accordingly, if the linear velocity is equal to or higher than 10 m per second, consumption of an inert gas increases vainly, and it is not preferable industrially. The above-mentioned linear velocity of an inert gas is a heater temperature-converted value obtained by compensating, with a volumetric change of an inert gas calculated based on a heater temperature, the linear velocity calculated based on the cross-sectional area of a flow path through which the inert gas flows and the supply amount of the inert gas.

The narrower the interval between the heater 130 and the flow-regulating member 140 in the longitudinal direction of the optical fiber base material 200 is, the more preferable it is. However, if the interval between the heater 130 and the flow-regulating member 140 made of carbon is made equal to or smaller than 3 mm at a step before heating, the interval between the heated flow-regulating member 140 and the heater 130 becomes smaller due to thermal expansion, and sparks are generated from the heater 130 in some cases. On the other hand, if the interval between the heater 130 and the flow-regulating member 140 in the longitudinal direction of the optical fiber base material 200 exceeds 80 mm, tarnish due to Si compound fine particles is generated to the optical fiber base material 200 between the heater 130 and the flow-regulating member 140 in some cases.

Also, the shape of the flow-regulating member 140 is not limited to a tubular shape, in terms of narrowing the cross-sectional area of the flow path and increasing the flow rate. However, if an inert gas flow generates a turbulent flow, a gas containing Si compounds volatilized from the optical fiber base material 200 may be stirred upward (in the direction as seen in the figure) in some cases. Accordingly, the shape of the flow-regulating member 140 is preferably a shape that is uniform or symmetric along the circumference of the optical fiber base material 200. Also, the shape of the flow-regulating member 140 preferably forms a smooth shape that does not generate a turbulent flow along the longitudinal direction of the optical fiber base material 200.

Furthermore, the supply port 119 for an inert gas is not limited to one location at an upper portion of the furnace body 110, but a plurality of the supply ports may be provided in both the longitudinal direction and circumferential direction of the optical fiber base material 200 as long as they are provided on the upstream side of the flow-regulating member 140. Also, although it does not contribute to formation of a gas flow by the flow-regulating member 140, mainly, for the purpose of protecting the heat insulating material 120 and the heater 130 from oxidation, the supply port 119 for introducing an inert gas may be provided further to the downstream side of the flow-regulating member 140.

Still furthermore, the manufacturing apparatus 100 according to the above-mentioned example has a structure in which the upper end of the optical fiber base material 200 is fixed, and an ineffective portion 201 is pulled from the lower end of the optical fiber base material 200. However, as a structure in which the lower end of the optical fiber base material 200 is fixed and the upper end thereof is pulled, the manufacturing apparatus 100 having a structure in which the flow-regulating member 140 is disposed at the lower side of the heater 130, and furthermore the an inert gas is supplied from the lower side of the flow-regulating member 140 may be formed.

Experimental Example

The manufacturing apparatus 100 including the flow-regulating member 140 as shown in FIG. 2 was operated as shown in FIG. 3 and FIG. 4 to manufacture the wire-drawing optical fiber base material 300 having the lead-out portion 203. Also, for comparison, at a step of forming the lead-out portion 203, the lead-out portion 203 was formed in a state where the supply amount of an inert gas from the supply port 119 was changed and the flow rate of a gas flow formed inside the flow-regulating member 140 was changed, and the quality of the fabricated wire-drawing optical fiber base material 300 was evaluated.

However, it is difficult to directly measure the linear velocity of the inert gas flowing inside the flow-regulating member 140, inside the manufacturing apparatus 100 in operation. In view of this, the linear velocity of the inert gas inside the flow-regulating member 140 was approximately calculated based on: the amount of the inert gas supplied from the supply port 119 which corresponds to the upstream side of the flow-regulating member 140 into the furnace body 110; the spatial cross-sectional area of the flow path for the inert gas formed between the flow-regulating member 140 and the optical fiber base material 200; and the heating temperature of the heater 130.

If the heater temperature was 2040° C., the inner diameter of the flow-regulating member 140 was 220 mm, and the outer diameter of the optical fiber base material 200 was 195 mm, the amount of the inert gas supplied into the upper portion furnace wall was changed from 30 NL per minute to 500 NL per minute, and the state of tarnish generated to the surface of the optical fiber base material 200 was observed. The result shows that tarnish was not generated if the gas flow amount was equal to or higher than 75 NL per minute (equivalent to 1.30 m/s if converted in terms of 2040° C.), but generation of tarnish was seen if the gas flow amount was equal to or lower than 60 NL per minute (equivalent to 1.04 m/s if converted in terms of 2040° C.).

In this manner, by fabricating the lead-out portion 203 with the inert gas flow flowing along the surface of the optical fiber base material 200 having being formed, generation of tarnish in the wire-drawing optical fiber base material 300 can be prevented, and consequently the lifetime of the furnace body 110 can be made longer. Accordingly, the quality of optical fibers can be improved. Also, the optical fiber production efficiency improves, and this contributes to reduction in the cost of optical fibers.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

100: manufacturing apparatus; 110: furnace body; 111: lower portion furnace wall; 112: lid portion furnace wall; 113: upper portion furnace wall; 119: supply port; 120: heat insulating material; 121: bottom portion heat insulating material; 122: lower portion heat insulating material; 123: lid portion heat insulating material; 124: upper portion heat insulating material; 130: heater; 132: electrode member; 134: electric power supply unit; 140: flow-regulating member; 141: flange portion; 142: tubular portion; 150: roller; 160: chuck; 200: optical fiber base material; 201: ineffective portion; 202: effective portion; 203: lead-out portion; 210: core material; 220: clad material; 230: dummy portion; 300: wire-drawing optical fiber base material

What is claimed is:

1. A manufacturing apparatus that manufactures a wire-drawing optical fiber base material, the manufacturing apparatus comprising:

a heater that heats an optical fiber base material;

an upper portion heat insulating material to surround the optical fiber base material;

a flow-regulating member arranged adjacent to the heater and lower than the upper portion heat insulating material, the flow-regulating member including:
   a tubular portion that surrounds the optical fiber base material, the tubular portion having an inner diameter smaller than an inner diameter of the upper portion heat insulating material, and
   a flange portion, integrated with the tubular portion, that spreads out from an upper end of the tubular portion and outward in a radial direction of the optical fiber base material;

a pulling unit that pulls part of the optical fiber base material softened by being heated by the heater and forms a drawing shape portion at an end portion; and a lower portion heat insulating material and a lid portion heat insulating material, inside of which the heater is disposed, the lid portion heat insulating material being stacked on the lower portion heat insulating material, wherein the flow-regulating member inhibits backflow of an outgas containing a Si compound generated from the optical fiber base material heated by the heater from forming along a surface of the optical fiber base material below the upper portion heat insulating material.

2. The manufacturing apparatus according to claim 1, wherein the flow-regulating member maintains a gas flow of an inert gas input through a supply port provided in the upper portion heat insulating material flowing toward the heater along the surface of the optical fiber base material at a linear velocity which is equal to or higher than 1.3 m per second and is lower than 10 m per second at a portion where the flow-regulating member is disposed.

3. The manufacturing apparatus according to claim 2, wherein the gas flow is a gas flow of an inert gas containing at least one of an argon gas and a nitrogen gas.

4. The manufacturing apparatus according to claim 1, wherein the flow-regulating member is arranged at an interval which is equal to or larger than 3 mm and is smaller than 80 mm from the heater in a longitudinal direction of the optical fiber base material.

5. The manufacturing apparatus according to claim 1, wherein the flow-regulating member is arranged in a section which is on an upstream side of the flow of an inert gas relative to the heater and where a member that supplies electric power to the heater is present.

6. The manufacturing apparatus according to claim 1, wherein the flow-regulating member is arranged between: a member that extends outward in the radial direction of the optical fiber base material and supplies electric power to the heater; and the optical fiber base material.

7. The manufacturing apparatus according to claim 1, wherein at a position away from a surface of the optical fiber base material, the flow-regulating member blocks flow of an inert gas from flowing in a longitudinal direction of the optical fiber base material.

8. The manufacturing apparatus according to claim 1, wherein the flow-regulating member directs an inert gas flow having a constant width in a longitudinal direction and a circumferential direction of the optical fiber base material.

9. The manufacturing apparatus according to claim 1, wherein
   the tubular portion is disposed inside the lower portion heat insulating material and the lid portion heat insulating material; and
   the flange portion is sandwiched by a top surface of the lid portion heat insulating material and a lower end of the upper portion heat insulating material.

10. The manufacturing apparatus according to claim 9, wherein
   the heater is disposed at a position where an outer diameter of the drawing shape portion begins to decrease in a longitudinal direction of the optical fiber base material, and
   the heater surrounds the end portion of the optical fiber base material.

11. The manufacturing apparatus according to claim 1, wherein
   the heater is disposed at a position where an outer diameter of the drawing shape portion begins to decrease in a longitudinal direction of the optical fiber base material, and
   the heater surrounds the end portion of the optical fiber base material.

* * * * *